United States Patent [19]
Hansen

[11] Patent Number: 5,168,642
[45] Date of Patent: Dec. 8, 1992

[54] TOBACCO DRYING APPARATUS

[76] Inventor: Elmer K. Hansen, Box 70244, Pahrump, Nev. 89041

[21] Appl. No.: 833,082

[22] Filed: Feb. 10, 1992

[51] Int. Cl.$^5$ .............................................. A01F 25/12
[52] U.S. Cl. ...................................... 34/239; 211/113; 211/60.1; 34/240; 248/316.3
[58] Field of Search ............... 34/239, 240, 218, 225, 34/243 R, 202; 248/316.1, 316.2, 316.3, 316.4–316.8; 294/5.5; 131/290; 211/113, 116, 60.1

[56] References Cited

U.S. PATENT DOCUMENTS

| | | | |
|---|---|---|---|
| 1,982,990 | 12/1934 | Harris | 34/240 |
| 2,455,684 | 12/1948 | Kirkpatrick | 34/239 |
| 3,154,335 | 10/1964 | Mish, Jr. | 34/239 |
| 3,937,227 | 2/1976 | Azumano | 34/225 |
| 4,790,334 | 12/1988 | Day, V et al. | 34/240 |

Primary Examiner—Henry A. Bennet
Assistant Examiner—Denise L. F. Gromada
Attorney, Agent, or Firm—Rudolph L. Lowell; Brian J. Laurenzo

[57] ABSTRACT

A tobacco drying apparatus for holding stalks of tobacco in a drying barn, in which a stalk of tobacco may be inserted upwardly into the drying apparatus and is automatically held against undesired downward removal therefrom. The drying apparatus includes first and second substantially parallel support members and at least one friction lock assembly which is attached to the second support member. The friction lock assembly has a gate member which is pivotal about an axis that is substantially parallel to a longitudinal axis of the second support member. The gate member further has a leading edge which extends toward the first support member, the leading edge of the gate member and the first support member which cooperate to receive a stalk of tobacco therebetween.

17 Claims, 3 Drawing Sheets

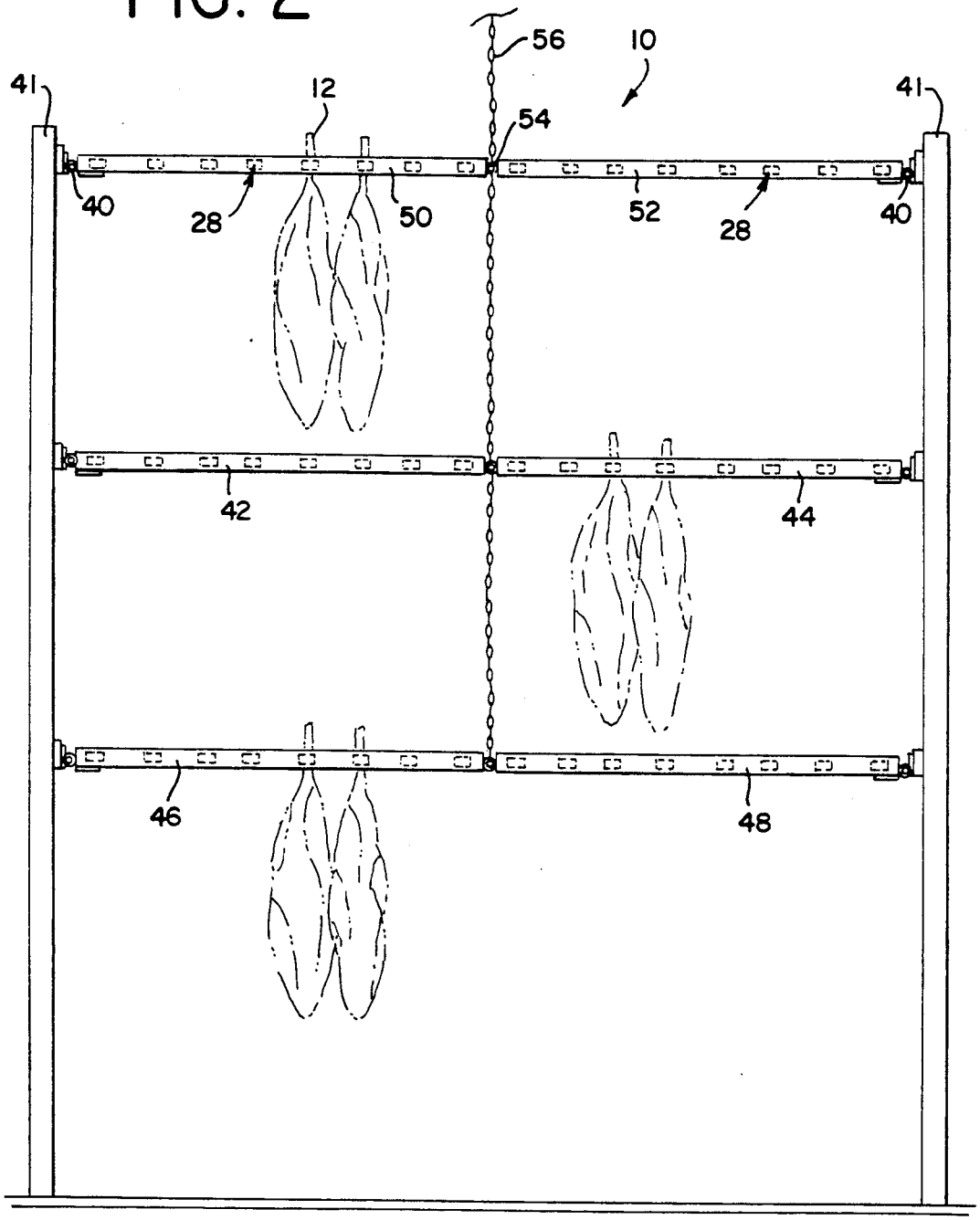

TOBACCO DRYING APPARATUS

BACKGROUND OF THE INVENTION

This invention relates to drying apparata for tobacco, and, more particularly, to an apparatus for holding a stalk of tobacco during drying in which the stalk may be inserted upwardly into the drying apparatus to be automatically held against undesired downward removal therefrom.

To allow leaves of tobacco to dry before processing into end products, stalks of tobacco are hung in drying barns for a period of time until the tobacco leaves have dried. Accordingly, the stalks of tobacco must be spaced far enough from each other to allow air drying of the leaves while not being spaced too far apart so as to waste a portion of the available area.

In the past, stalks of tobacco have been hung in drying barns by spearing several stalks on the end of a stick, spacing the stalks along the stick, and then hanging the stick, along with many others, in the drying barn. Spearing the stalks is difficult and the multi-step process is labor intensive and time consuming resulting in high cost over time.

None of the prior art attempts at hanging tobacco for drying have comprised a means for holding the tobacco without the spearing and multi-step operation described above. Reducing the labor and time involved in hanging the tobacco stalks for drying is, accordingly, desirable.

The difficulties in the prior art drying apparata for tobacco is substantially eliminated by the present invention.

SUMMARY OF THE INVENTION

Accordingly, it is an object of the present invention to provide means for holding stalks of tobacco in a drying barn without passing through the stalk with a spear or other piercing tool.

It is another object of the present invention to provide means for holding stalks of tobacco in a drying barn which does not require several steps of operation.

It is still another object of the present invention to provide a tobacco drying apparatus in which a stalk of tobacco may be inserted upwardly into the drying apparatus to be automatically held against undesired downward removal therefrom.

A further object of the present invention is to provide a tobacco drying apparatus in which a pivotal locking assembly is mounted on one support member for movement relative to an opposite support member into and out of engagement with a stalk of tobacco to be held.

Yet another object of the present invention is to provide a tobacco drying apparatus which is less time consuming and less labor intensive to operate than the prior art.

These and other objects of the invention will become apparent upon reference to the following specification, drawings, and claims.

The present invention is a tobacco drying apparatus for holding stalks of tobacco in a drying barn, in which a stalk of tobacco may be inserted into the drying apparatus and is automatically held against undesired removal therefrom. The drying apparatus comprises substantially parallel first and second support members and at least one friction lock assembly attached to the second support member, the friction lock assembly having a gate member which is pivotal about an axis that is substantially parallel to a longitudinal axis of the second support member. The gate member further has a leading edge which extends toward the first support member, the leading edge of the gate member and the first support member which cooperate to receive a stalk of tobacco therebetween.

BRIEF DESCRIPTION OF THE DRAWINGS

FIG. 2 is an elevational view of the arrangement shown in FIG. 1 after the frame assemblies have been pivoted into suspended substantially horizontal orientations for receipt of the tobacco stalks;

DETAILED DESCRIPTION OF THE INVENTION

Illustrated in the Figures, generally at 10, is a tobacco drying apparatus for holding stalks of tobacco 12 in a drying barn, wherein a stalk of tobacco 12 may be inserted upwardly into the drying apparatus 10 and is automatically held against undesired downward removal therefrom.

Figure 4:
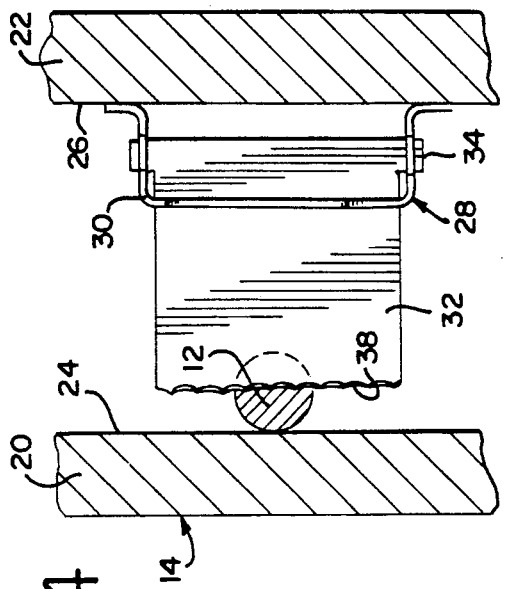
FIG. 4 is a top plan view of a portion of the frame assembly taken along lines 4—4 of FIG. 5.
Figure 5:
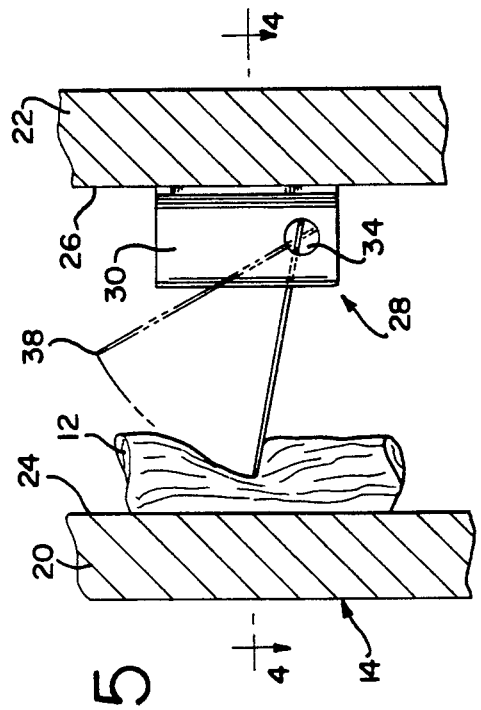
FIG. 5 is an elevational view of a portion of the frame assembly of FIG. 3.
Figure 3:
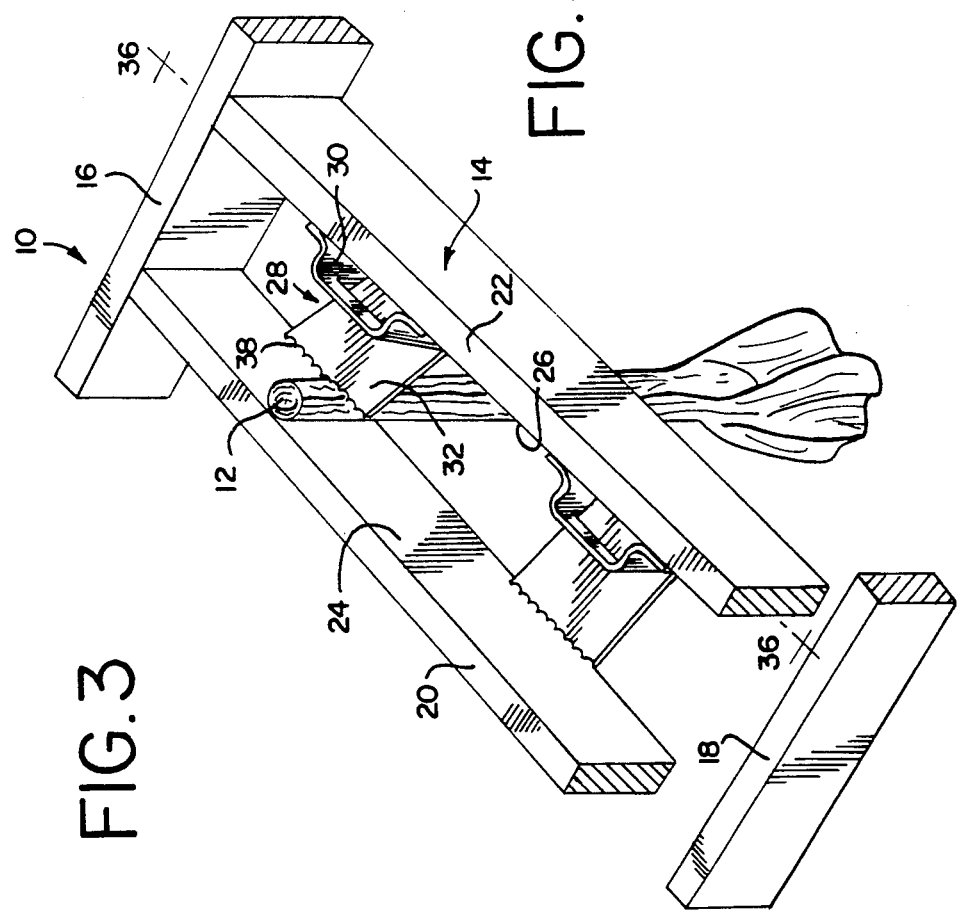
FIG. 3 is a detailed perspective view of a portion of a frame assembly showing a tobacco stalk held therein.

As shown in detail in FIGS. 3–5, the tobacco drying apparatus 10 includes a frame assembly 14 which is made up of substantially parallel first and second arm members 16 and 18, respectively. The frame assembly 14 further includes substantially parallel first and second cross support members 20 and 22, respectively, which are operably positioned between the arm members 16 and 18. The cross support members 20 and 22 have first and second mounting surfaces 24 and 26, respectively, which are located on the interior of the frame assembly 14 and face each other. The mounting surfaces 24 and 26 are spaced a distance apart which will accommodate a tobacco stalk and the holding means as will be described further in detail.

At least one friction lock assembly 28 is attached to the mounting surface 26 on the second cross support member 22. The friction lock assembly 28 includes a mounting bracket 30 which is attached to the mounting surface 26 by any number of attachment means. The friction lock assembly 28 also includes a gate member 32 which pivots on a pivot member 34 that is parallel to a longitudinal axis 36 of the second cross support member 22. The gate member 32 has a leading edge 38 which is extended towards the mounting surface 24 on the first cross support member 20. As is shown in FIGS. 3–5, the leading edge 38 may be serrated.

When a particular friction lock assembly 28 is not holding a tobacco stalk 12, the gate member 32 hangs in a substantially horizontal orientation as shown in FIG. 5. Upon the upward insertion of a tobacco stalk 12 through the bottom of the frame assembly 14 and between the friction lock assembly 28 and the mounting surface 24 on the first cross support member 20, the gate member 32 is pivoted upwardly by the tobacco stalk 12 along the range of movement shown in FIG. 5. Once the tobacco stalk has been inserted a certain distance past the leading edge 38 of the gate member 32, the tobacco stalk may then be pulled downwardly thereby pulling the gate member 32 downwardly and causing the tobacco stalk 12 to be wedged between the leading edge 38 of the gate member 32 and the mounting surface 24 on the first cross support member 20. As the tobacco stalk 12 continues to be pulled downwardly, the stalk 12 becomes wedged between the leading edge 38 of the gate member 32 and the mounting surface 24. The tobacco stalk 12 is now held by friction against the mounting surface 24 on the first cross support member 20 resulting in retention of the stalk 12 against any undesired downward removal. If the leading edge 38 of the gate member 32 is serrated, the leading edge will actually penetrate the tobacco stalk 12 in a biting manner thereby enhancing the grip between the gate member 32 and the mounting surface 24.

In order to remove the tobacco stalk 12 from the tobacco drying apparatus 10, the stalk 12 is pushed further in an upwardly direction and to the right or left side causing the leading edge 38 of the gate member 32 to pivot away from the mounting surface 24 of the first cross support member 20. The tobacco stalk 12 is then pulled downwardly and removed from the tobacco drying apparatus 10.

Figure 1:
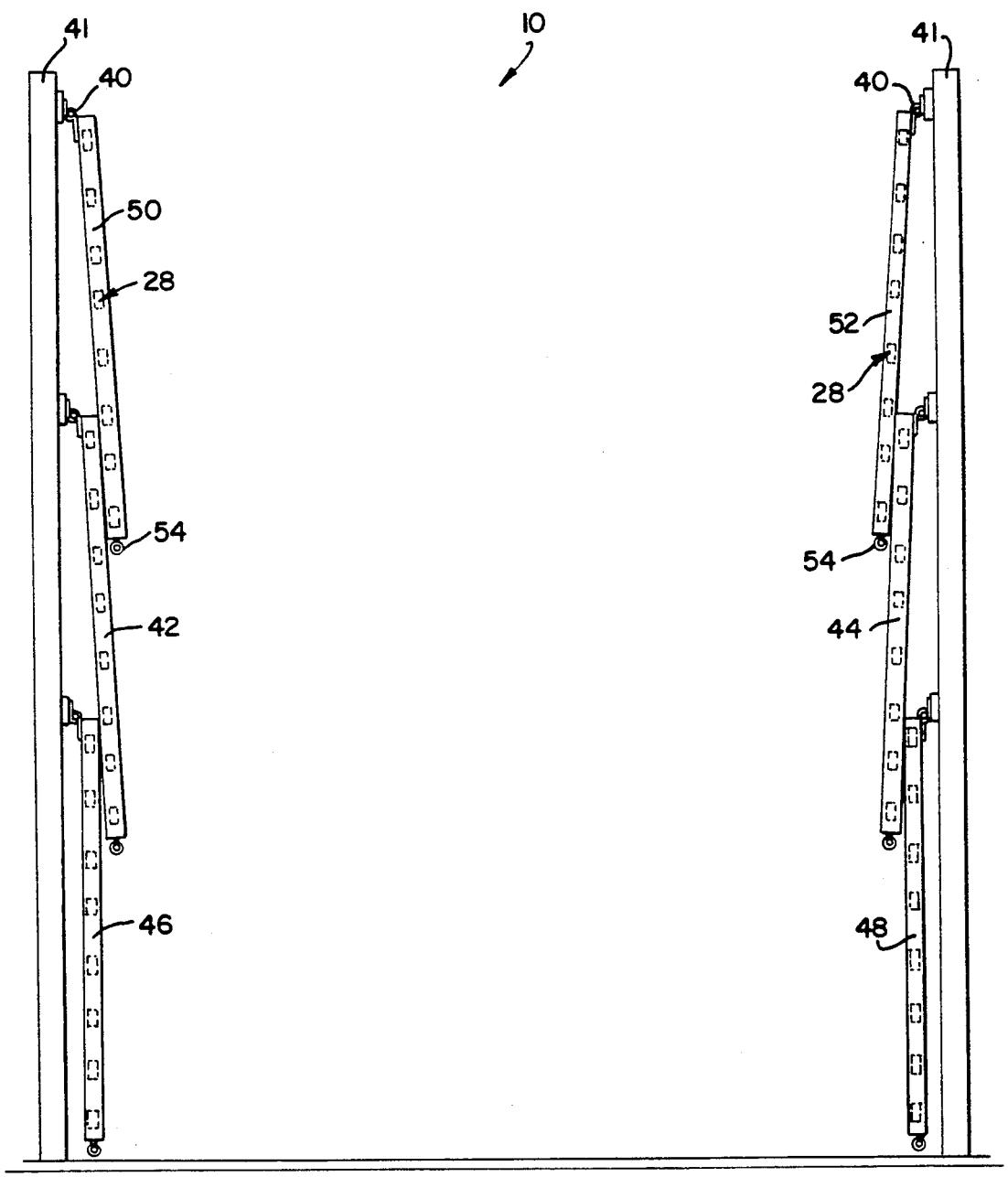
FIG. 1 is an elevational view of the present invention in which the frame assemblies of the tobacco drying apparatus are depicted in substantially vertical orientations before insertion of a group of tobacco stalks.

As shown in FIGS. 1 and 2, the tobacco drying apparatus 10 is a modular unit which may be configured in many ways depending on the size constraints of the drying barn or other structure. Means 40 may be included to pivotally connect the frame assemblies to vertical support posts 41 thereby allowing the arm member 36 and, in turn, the frame assembly 14 of the tobacco drying apparatus 10 to pivot from a first position in which the frame assembly 14 hangs downwardly in a substantially vertical orientation to a second position in which the frame member 14 extends outwardly in a substantially horizontal orientation. Such an arrangement allows lower frame assemblies, such as 42, 44, 46 and 48, to be pivoted downwardly and out of the way of upper frame assemblies, such as 50 and 52, during loading or unloading of tobacco from the upper frame assemblies 50 and 52. Accordingly, multiple levels of frame assemblies are possible.

The frame assembly may include connecting means 54 for connection to a like frame assembly as shown in order to be suspended in their substantially horizontal orientation. Alternatively, the connecting means 54 of the frame assemblies may be attached to a chain 56 which hangs from the ceiling of the drying barn or like structure. Accordingly, two or more frame assemblies can be arranged side by side.

In addition, many friction lock assemblies 28 may be located in a row on a single mounting surface 26 of a cross support member 22 as is shown in the Figures.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. By way of example, while the friction lock assemblies 28 are all shown on the same mounting surface 26 of second cross support member 22, it is anticipated that some friction lock assemblies could be attached to the mounting surface 26 of second cross support member 22 while others could be attached to the mounting surface 24 of first cross support member 20. Furthermore, it is contemplated that the frame assembly 14 does not have to be suspended in a horizontal orientation during drying as other orientations could also obtain the same result.

I claim:

1. A tobacco drying apparatus for holding stalks of tobacco in a drying barn, in which a stalk of tobacco may be inserted into said drying apparatus and is automatically held against undesired removal therefrom, said tobacco drying apparatus comprising:
    (a) at least one frame assembly;
    (b) said frame assembly having first and second arm members, said first arm member which is substantially parallel to said second arm member;
    (c) said frame assembly further having first and second cross support members operably positioned between said arm members, said first cross support member which is substantially parallel to said second cross support member, said first cross support member having a first mounting surface thereon, said second cross support member having a second mounting surface thereon, said first mounting surface facing said second mounting surface; and
    (d) at least one friction lock assembly attached to said second mounting surface, said friction lock assembly having a gate member which is pivotal about an axis that is substantially parallel to a longitudinal axis of said second cross support member, said gate member further having a leading edge which extends towards said first mounting surface, said leading edge of said gate member and said first mounting surface which cooperate to receive a stalk of tobacco therebetween.

2. The tobacco drying apparatus of claim 1, further comprising pivotal connecting means at one end of each of said arm members for allowing said arm members to be pivotally connected to a vertical support member, said pivotal connecting means allowing said arm members to pivot from a first position in which said arm members hang downwardly in a substantially vertical orientation to a second position in which said arm members extend outwardly in a substantially horizontal orientation.

3. The tobacco drying apparatus of claim 2 in which said arm members further comprise attachment means at the end of each of said arm members which is opposite to said pivotal connecting means for allowing said arm members to be suspended in said second substantially horizontal orientation.

4. The tobacco drying apparatus of claim 3 in which said attachment means allow for attachment of an arm member of one frame assembly to an arm member of another frame assembly.

5. The tobacco drying apparatus of claim 3 in which said attachment means allow for attachment of said arm member to a chain which is suspended from the ceiling of a tobacco drying barn.

6. The tobacco drying apparatus of claim 1 in which two of said frame assemblies are arranged side by side.

7. The tobacco drying apparatus of claim 1 in which several of said frame assemblies are arranged in a row.

8. The tobacco drying apparatus of claim 1 in which two of said frame assemblies are arranged so that a first frame assembly is located below a second frame assembly.

9. The tobacco drying apparatus of claim 8 in which a third frame assembly is located above said second frame assembly.

10. The tobacco drying apparatus of claim 1 in which more than one friction lock assembly is attached to said mounting surface of said second cross support member.

11. The tobacco drying apparatus of claim 1 in which said leading edge of said gate member is serrated.

12. A tobacco drying apparatus for holding stalks of tobacco in a drying barn, in which a stalk of tobacco may be inserted upwardly into said drying apparatus and is automatically held against undesired downward removal therefrom, said tobacco drying apparatus comprising:
    (a) first and second support members, said first support member which is substantially parallel to said second support member, said first support member having a first mounting surface thereon, said second support member having a second mounting surface thereon, said first mounting surface facing said second mounting surface; and
    (b) at least one friction lock assembly attached to said second mounting surface, said friction lock assembly having a gate member which is pivotal about an axis that is substantially parallel to a longitudinal axis of said second support member, said gate member further having a leading edge which extends toward said first mounting surface, said leading edge of said gate member and said first mounting surface which cooperate to receive a stalk of tobacco therebetween.

13. The tobacco drying apparatus of claim 12 in which more than one friction lock assembly is attached to said mounting surface of said second support member.

14. The tobacco drying apparatus of claim 12 in which said leading edge of said gate member is serrated.

15. A tobacco drying apparatus for holding stalks of tobacco in a drying barn, in which a stalk of tobacco may be inserted into said drying apparatus and is automatically held against undesired removal therefrom, said tobacco drying apparatus comprising:
    (a) first and second support members, said first support member which is substantially parallel to said second support member; and
    (b) at least one friction lock assembly attached to said second support member, said friction lock assembly having a gate member which is pivotal about an axis that is substantially parallel to a longitudinal axis of said second support member, said gate member further having a leading edge which extends toward said first support member, said leading edge of said gate member and said first support member which cooperate to receive a stalk of tobacco therebetween.

16. The tobacco drying apparatus of claim 15 in which more than one friction lock assembly is attached to said second support member.

17. The tobacco drying apparatus of claim 15 in which said leading edge of said gate member is serrated.

* * * * *